United States Patent [19]

Hovis

[11] 3,868,094

[45] Feb. 25, 1975

[54] FURNACE CONTROL SYSTEMS

[75] Inventor: James E. Hovis, Jefferson Township, Allegheny County, Pa.

[73] Assignee: Bloom Engineering Company, Inc., Pittsburgh, Pa.

[22] Filed: June 15, 1973

[21] Appl. No.: 370,288

[52] U.S. Cl............ 266/5 T, 235/150.1, 235/151.1, 236/15 B, 266/5 H, 432/54
[51] Int. Cl............................................. C21d 1/00
[58] Field of Search.................... 266/5 H, 5 T, 5 R; 235/150.1, 151.1; 236/15 B; 432/54

[56] References Cited
UNITED STATES PATENTS

| | | | |
|---|---|---|---|
| 2,620,174 | 12/1952 | Passafaro | 236/15 B |
| 2,998,195 | 8/1961 | Kahn | 236/15 B |
| 3,022,056 | 2/1962 | Dailey, Jr. | 266/5 H |
| 3,548,171 | 12/1970 | Kodz | 266/5 T X |
| 3,604,695 | 9/1971 | Steeper | 266/5 T |

*Primary Examiner*—Roy Lake
*Assistant Examiner*—Paul A. Bell
*Attorney, Agent, or Firm*—Webb, Burden, Robinson & Webb

[57] ABSTRACT

A heating control process for a top and bottom zone metallurgical furnace includes directly measuring in one zone only the surface temperature of a workpiece passing through the furnace and then simultaneously transmitting the signal from the direct workpiece measurement to top and bottom zone controllers, each of which have a desired preset temperature. The signals from the controllers actuate a top zone motor and a bottom zone motor, respectively to drive furnace burners to maintain the desired preset temperature. The signal from the direct workpiece measurement is normally directed through a top to bottom zone temperature ratio device to compensate for the difference in requirements between the respective zones.

3 Claims, 1 Drawing Figure

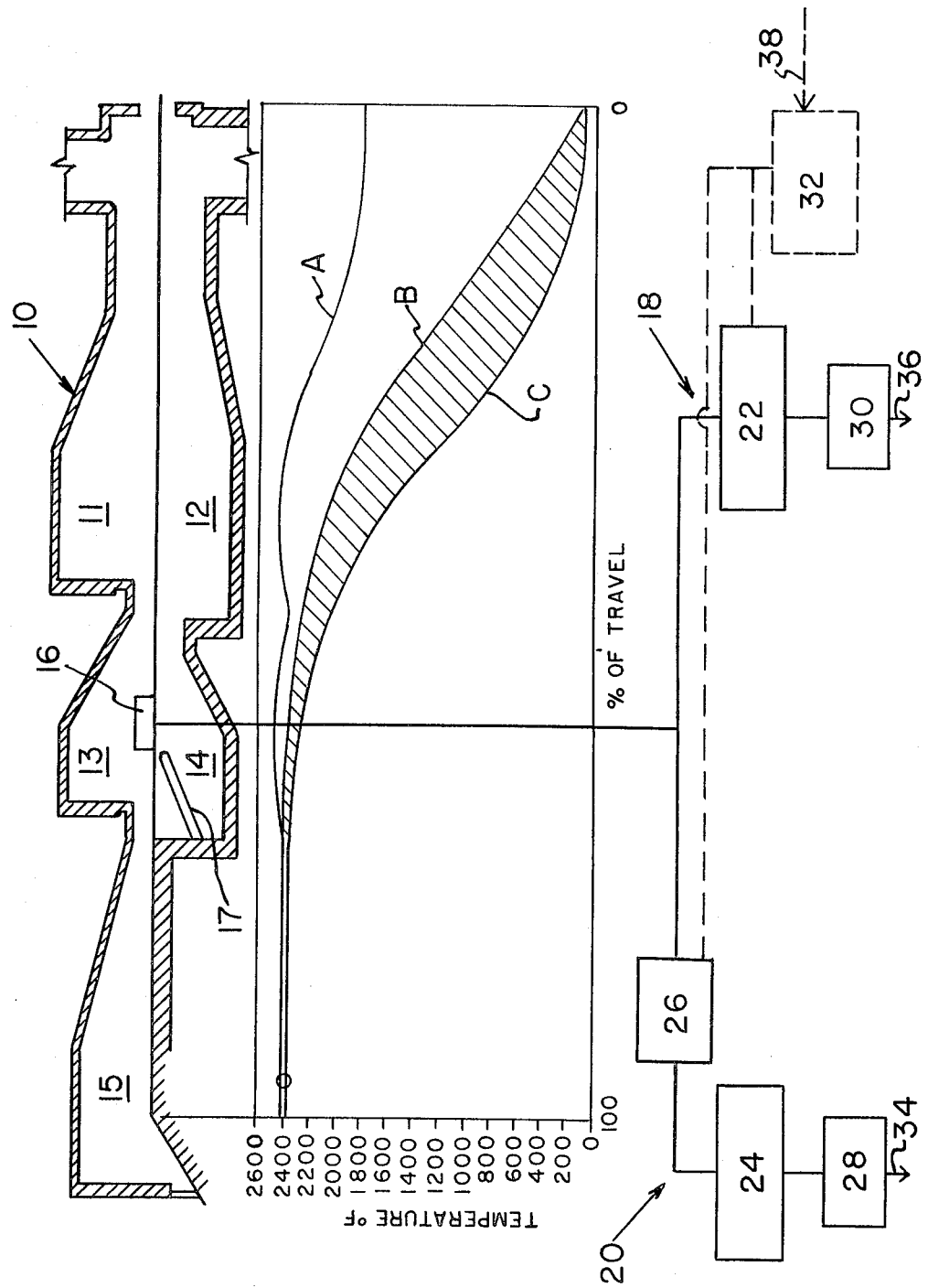

FURNACE CONTROL SYSTEMS

FIELD OF THE INVENTION

My invention relates to metallurgical furnace control systems and, more particularly, to control systems for reheating furnaces which receive as an input a signal from a direct workpiece temperature measurement.

DESCRIPTION OF THE PRIOR ART

The reheating of steel billets, blooms or slabs is often conducted in a multi-zone reheat furnace having top and bottom zones in which the workpiece passes along the center line of the furnace and between the zones. Furnace construction often dictates different heat input requirements for the various zones. For example, in a hot mill reheat furnace for steel slabs, the refractory insulation around the water-cooled skid and support pipes in the bottom zone tends to deteriorate with use thereby requiring increased heat input into the bottom zone.

Heretofore a furnace temperature measurement, as opposed to a direct workpiece measurement, has been taken in one of the zones with the other zone being slaved thereto through the fuel demand signal from the first zone. For example, the furnace temperature measurement from the top zone is sent to a controller and the output signal from the controller is directed to control motors which adjusts combustion air or fuel in both zones in accordance with the signal. This type of control system requires a continual adjustment since the heat loss due to exposed water-cooled pipes increases in the bottom zone as the skid and support pipe insulation deteriorate. Further, the signal is based on a furnace measurement not a direct workpiece measurement so additional error is present.

More recently, attempts have been made to take direct steel temperature measurements in the various zones and control each zone independently on the basis of the direct steel temperature measurement. This, of course, requires independent control systems for each zone. Direct steel temperature measurements in each zone also create problems since it is necessary to position the sight tube immediately adjacent the workpiece to get an accurate temperature measurement. Variations in slab thickness and the occasional piling of the workpieces within a top zone do not lend themselves to accurate direct steel temperature measurement.

SUMMARY OF THE INVENTION

My invention permits top and bottom zones to be accurately controlled through the taking of a single direct workpiece temperature measurement. My control system also takes into account the increasing demand on the bottom zone which results from the deterioration of the insulation the water-cooled skid and support pipes. My invention further eliminates the dependence on furnace temperature measurements as the control signal and the need for direct workpiece measurements in each zone where such measurement takes place.

My invention is a process for controlling a top and bottom zone reheat furnace in which the zones are controlled by a signal from a direct steel temperature measurement in one of the zones. The signal is preferably sent through a top to bottom ratio device and is simultaneously sent to a controller for each zone, each controller having a desired preset temperature. A mill delay control program can be added to the system and the system is readily adaptable to computerized feed forward control.

BRIEF DESCRIPTION OF THE DRAWING

The sole drawing is a schematic illustrating a five zone reheat furnace, the ideal temperature curve therefor and the control system which assures the obtention of the ideal heating curve.

DESCRIPTION OF THE PREFERRED EMBODIMENT

I have illustrated my invention in the sole FIGURE with reference to a five zone reheat furnace used in steel mills prior to the hot rolling operation. My control system is equally applicable to other metallurgical furnaces which include top and bottom zones and in which a direct workpiece temperature measurement can be made.

The furnace, generally designated 10, comprises five zones for the treatment of steel slabs 16 passing along the center line of the furnace. Top zone 11 and bottom zone 12 represent the preheat zones whereas top zone 13 and bottom zone 14 represent the intermediate zone. Zone 15 is referred to as the soak zone and the slabs 16 exit the furnace from zone 15 for hot rolling.

Each slab 16 is moved along skid rails as a new slab enters the furnace 10 and these skid rails and support pipes, not shown, are water-cooled and refractory protected as a result thereof.

The ideal heating curve for the reheat furnace 10 along each of the respective zones includes the furnace temperature curve, line A, the steel surface temperature curve, line B, and the steel slab center temperature curve, line C. As the slab 16 enters the furnace it is substantially cooler than the furnace temperature and it is normally of uniform temperature from slab center to slab surface. As the slab 16 passes through the reheat zones 11 and 12, the slab surface is heated first thereby creating a substantial temperature gradient between the surface and the center of the slab. As the slabs approach the intermediate zones 13 and 14, the temperature gradient between the steel surface B and the steel center C is lessened and the slab temperatures A and B approach the furnace temperature A. The soak zone 15 soaks out the slab which has now achieved a substantially uniform temperature throughout its profile.

The slab temperature is taken by means of a radiation pyrometer or the like having a site tube 17 which extends into the furnace to a position adjacent the slab 16. Other temperature measuring devices can be employed as long as they are able to obtain a direct temperature measurement of the workpiece in the furnace. I prefer to take the direct temperature measurement in the bottom zone 14 in an area between the skids since the measuring device in that poisiton is not effected by slab thickness or subjected to damage from a slab pile up in the furnace.

Under normal heating conditions, the top slab surface temperature is preferably hotter than the bottom by option of the furnace operator to run the bottom surface slightly colder than the top or may run hotter because of the shadow effect of the support pipes. However, a direct temperature measurement on one surface can still be utilized as an input signal for the top and bottom zones. My control system is illustrated for the intermediate zones 13 and 14 furnace 10, although it is equally applicable to the preheat zones 11 and 12.

The signal from the direct temperature measurement of the bottom of slab 16, normally in millivolts, is transmitted to the bottom temperature control system, generally designated 18, and the top temperature control system, generally designated 20.

Specifically the sole input signal is directed to bottom temperature controller 22 and top temperature controller 24. The input signal passes through a top to bottom ratio device 26 prior to reaching the top controller 24. This device 26 has a preset ratio value that takes into account the difference in temperature reading and actual desired temperature between the top and bottom slab surfaces. A dial is set for the desired temperature in both the top temperature controller 24 and the bottom temperature controller 22. The input signal going into the respective controllers is then compared against the preset temperature and an output signal from the temperature controllers representing the difference from the comparison is sent to the temperature control motor 28 for the top temperature control system 20 and temperature control motor 30 for the bottom temperature control system 18. The motors 28 and 30 drive the respective burners in the top and bottom zones 13 and 14 so as to achieve the desired preset temperature contained within the top and bottom controllers 24 and 22, respectively. This latter control is conventional with the temperature control motors driving the fuel input valve, the air input valve and/or the fuel to air ratio of the burners, not shown, in the desired manner. The signal from the motors 28 and 30 to the various valves of the burners is illustrated by arrows 24 and 36, respectively.

The advantage of slaving the top controller directly from the bottom zone temperature signal rather than past practice of from a fuel demand signal is that irrespective of loss of skid or support pipe insulation in the bottom zone, the preset relationship will hold because bottom zone fuel is entirely independent and can be increased to accommodate higher heat losses without any affect on the top zone fuel.

A control 32 for mill delay is easily inserted in my control system by directing a signal of the mill delay represented by arrow 38 into the bottom temperature controller 22 and the temperature ratio device 26 for the top temperature controller 24. The delay signal resets the temperature control index points in the controller 22 and 24 so that the heat input is reduced in both zones to prevent surface temperatures from exceeding that of the heating curve.

In order to maintain the ideal temperature curve illustrated for all operating conditions, product mix and size and production rate data can be fed ahead into my control system prior to the entry of the steel slab 16 so that the controllers 22 and 24 are properly set in advance of receiving the steel. This permits adjustment prior to input rather than adjustment after the occurence has taken place.

I claim:

1. In a process for hot rolling workpieces in a rolling mill and controlling the zone temperature of a multiple zone metallurgical reheating furnace in which there are top and bottom zones and in which workpieces pass through the furnace intermediate the top and bottom zones prior to rolling, the improvement comprising utilizing a direct workpiece temperature measurement as the sole primary control by:
   A. directly measuring the surface temperature of the workpiece in one of the top or bottom zones;
   B. simultaneously transmitting a signal from the direct workpiece measurement to a top zone controller and to a bottom zone controller, each of which has a desired preset temperature; and
   C. actuating a top zone motor and a bottom zone motor through the respective top and bottom zone controllers so as to drive furnace burners to maintain the desired preset temperatures.

2. In a process for hot rolling workpieces in a rolling mill and controlling the zone temperature of a multiple zone metallurgical reheating furnace in which there are top and bottom zones and respective top and bottom zone controllers and in which workpieces pall through the furnace intermediate the top and bottom zones prior to rolling, the improvement comprising utilizing a direct rolling workpiece temperature measurement as the primary control by:
   A. directly measuring the surface temperature of the workpiece in one of the top or bottom zones;
   B. simultaneously transmitting the signal from the direct workpiece measurement to a top to bottom zone temperature ratio device while transmitting the signal to the zone controller in which the direct temperature measurement was made, said signal being appropriately altered by said device and sent on to the other zone controller, each zone controller having a desired preset temperature; and
   C. actuating top zone motor and a bottom zone motor through the respective top and bottom zone controllers so as to drive furnace burners to maintain the desired preset temperatures.

3. The improvement of claim 2, the process including directing delay signals from the rolling mill to the top and bottom zone controllers to effectuate a change in the preset temperature to accommodate the mill delay.

* * * * *

UNITED STATES PATENT OFFICE
CERTIFICATE OF CORRECTION

PATENT NO. : 3,868,094
DATED : February 25, 1975
INVENTOR(S) : James E. Hovis

It is certified that error appears in the above—identified patent and that said Letters Patent are hereby corrected as shown below:

Column 2 Line 66 After the number --14-- insert --of--.

Claim 2 - Column 4 Line 27 --pall-- should read --pass--.

Claim 2 - Column 4 Line 42 After --actuating-- insert --a--.

Signed and sealed this 29th day of April 1975.

(SEAL)
Attest:

RUTH C. MASON
Attesting Officer

C. MARSHALL DANN
Commissioner of Patents
and Trademarks